United States Patent [19]

Ayers et al.

[11] Patent Number: 4,647,434
[45] Date of Patent: Mar. 3, 1987

[54] SUPPORT ASSEMBLY FOR REGENERATOR AIR DISTRIBUTOR IN A FLUID CATALYTIC CRACKING UNIT

[75] Inventors: Harold J. Ayers, Woodlands; Ting Y. Chan, Houston, both of Tex.

[73] Assignee: Texaco Inc., White Plains, N.Y.

[21] Appl. No.: 756,533

[22] Filed: Jul. 19, 1985

[51] Int. Cl.⁴ .................. B01J 8/24; F16M 13/02; B23K 28/00
[52] U.S. Cl. ........................... 422/144; 165/82; 248/288.3; 248/324; 248/DIG. 1; 422/143; 422/310
[58] Field of Search ............... 422/143, 144, 310; 248/DIG. 1, 288.3, 324; 165/82

[56] References Cited

U.S. PATENT DOCUMENTS 4,101,288 7/1978 Smith et al. .................. 422/144

Primary Examiner—David L. Lacey
Assistant Examiner—William R. Johnson
Attorney, Agent, or Firm—Jack H. Park; Kenneth R. Priem; Richard A. Morgan

[57] ABSTRACT

A support assembly for the air distributor in the catalyst regenerator vessel of a fluid catalytic cracking apparatus is revealed. The support assembly comprises a primary support which fixedly connects the air distributor to the catalyst regenerator and a plurality of secondary rigid supports. The secondary rigid supports connect to both the air distributor and catalyst regenerator vessel with ball and socket joints.

The support assembly allows for unrestricted multi directional thermal expansion of the air distributor without causing twisting or warping.

3 Claims, 3 Drawing Figures

SUPPORT ASSEMBLY FOR REGENERATOR AIR DISTRIBUTOR IN A FLUID CATALYTIC CRACKING UNIT

BACKGROUND OF THE INVENTION

In the catalyst regenerator of a fluid catalytic cracking unit there is typically positioned one or more pipe headers fitted with a plurality of nozzles for distributing regeneration gas into the bed of spent catalyst. These pipe headers are frequently but not necessarily shaped in a ring configuration and supplied by a regeneration gas supply header entering the vessel from below as illustrated in U.S. Pat. Nos. 3,912,460 and 4,443,551 both incorporated herein by reference.

These pipe headers called air distributors are supported in the vessel and since the distributor temperature is high, approaching the process temperature (1100° to 1400° F.), and the shell temperatures are low (200° to 400° F.); protected by insulation, the air distributor support assembly must be able to compensate for considerable thermal expansion between the air distributor apparatus, air supply header, vessel supporting structure and supporting elements.

The air distributor support assembly shown in U.S. Pat. No. 4,101,288; incorporated herein by reference, solved a number of problems associated with thermal expansion experienced in air distributors. This was accomplished, as shown in FIG. 1 of the patent by alignment of pivotally mounted support members to allow for movement and recovery from differential thermal expansion. The direction of thermal expansion induced motion must be predicted when using this assembly to achieve the best alignment of this apparatus. The present invention is an improvement in that it renders such alignment unnecessary, and still compensates for air distributor expansion, warping and twisting.

BRIEF SUMMARY OF THE INVENTION

The invention is an improvement in the regeneration gas distributor support assembly in a catalyst regenerator vessel of a fluid catalytic cracking apparatus.

A first support means fixedly connects the regeneration gas distributor to the regenerator vessel. The regeneration gas distributor is supported by, along with the first support means, a plurality of rigid supports. The rigid supports are adapted to be connected between the regeneration gas distributor and the catalyst regenerator vessel. The lower end of the rigid support is connected to the catalyst regenerator vessel by means of a first ball and socket joint. The upper end of the rigid support is connected to the air distributor by means of a second ball and socket joint.

The support assembly provides the regeneration gas distributor with multi-directional support and is not so subject to regeneration gas distributor twisting or buckling caused by non uniform or restricted thermal expansion. The support assembly allows unrestricted horizontal growth of the air distributor assembly.

BRIEF DESCRIPTION OF THE DRAWINGS

The drawings diagrammatically illustrate one form of the invention wherein like reference numerals designate corresponding parts in the several views in which.

DETAILED DESCRIPTION OF THE DRAWINGS

Figure 1:
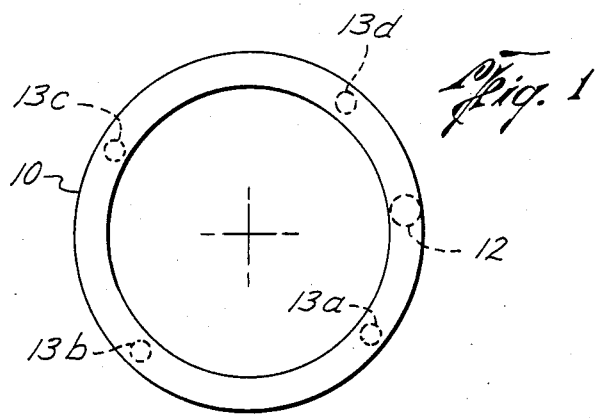
FIG. 1 is a plan view of the regeneration gas distributor showing the position of the support assembly.
Figure 2:
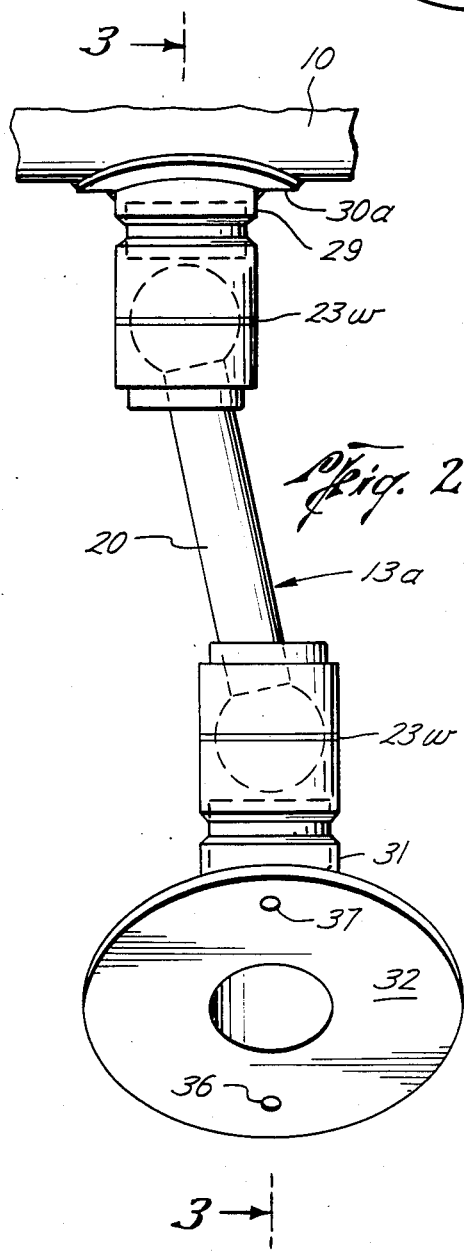
FIG. 2 is a schematic diagrammatic elevational view of a support assembly for supporting a regeneration gas distributor in a regenerator vessel of a fluid catalytic cracking apparatus.
Figure 3:
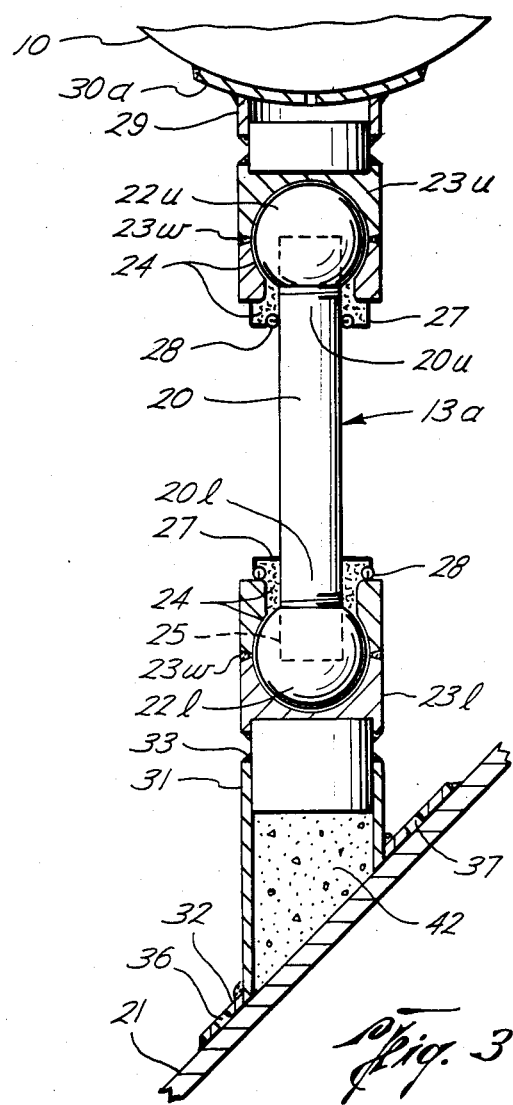
FIG. 3 is a section 3—3 on FIG. 2.

While various support devices may be formed by the invention, FIGS. 1-3 illustrate at least one support assembly that may be formed as described herein.

FIG. 1, a plan view of the regeneration gas distributor 10, is a schematic view of the positioning of the support assembly relative to the regeneration gas distributor 10. This support assembly comprises first support 12, such as the air supply header and four secondary elongated rigid supports 13a, 13b, 13c and 13d.

FIG. 2 is a schematic side view of one of the secondary elongated rigid supports 13a of the total support assembly and FIG. 3 is a sectional view taken at 3—3 on FIG. 2. The support assembly supports regeneration gas distributor 10 on the bottom of a catalyst regenerator vessel 21, in a fluid catalytic cracking (FCC) apparatus. Secondary support 13a comprises rigid support member 20 comprising an upper end 20u and a lower end 20l.

Lower end 20l of rigid support member 20 is connected to a lower ball 22l seated in lower socket 23l. Upper end 20u is connected to an upper ball 22u seated in upper socket 22u. Each ball and socket comprises a ball and socket joint. The lower end 20l is connected to lower ball 22l in this case by means of threads 25, but the ball may be connected by any means such as welding, slip fitting, integrally forming, etc. Threads 25 are preferred because they allow for easy leveling of regeneration gas distributor 10 for the best distribution of regeneration gas in the catalyst bed (not shown) of the fluid catalytic cracking (FCC) regenerator vessel 21.

Assembly is effected by filling the socket 23 with fiber insulating material 24 and then inserting the ball 22 and rigid support member 20. Fiber insulating material 24; for example asbestos or glass wool, packed into the joint, seals the area from catalyst intrusion while allowing movement in the joint. Final assembly of the socket is made with welds 23w. Fiber insulation material 24 is held in place by means of brackets 27 and braided wire hose 28 which seals the area from catalyst while allowing movement of the joint. The braided wire hose 28 will compress and expand without permanent deformation.

An upper sleeve 29 is secured, as by welding to a pad 30a, which sleeve is also welded to the regeneration gas distributor 10 at the desired point of support. Directly below, a similar lower sleeve 31 is secured to pad 32 which is secured, as by welding to the internal bottom surface of the catalyst regenerator vessel 21. Insulating refractory 42 is installed in the vacant space inside the lower enlarged sleeve. A vent hole 35 is formed in the upper pad 30 and vent holes 36 and 37 are formed in the lower pad 32 for escape of air between the pads and their contiguous structure to which the pads are welded.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. For example, variously shaped regeneration gas distributors are envisioned. Accordingly, it is expressly intended that all such variations and changes which fall within the spirit and scope of the present invention as defined in the following claims be embraced thereby.

What is claimed is:

1. A fluid catalytic cracking apparatus comprising a catalyst regenerator vessel, a regeneration gas distributor located therein and support assembly for said regeneration gas distributor comprising:
    (a) a primary support fixedly connecting the catalyst regenerator vessel to the regeneration gas distributor;
    (b) a plurality of elongated secondary rigid supports connected between the regeneration gas distributor and the catalyst regenerator vessel wherein each of said secondary supports has a lower end and an upper end and wherein the plurality of secondary supports along with the primary support supports the regeneration gas distributor;
    (c) a first ball means attached to the lower end of each of said secondary rigid supports seated in a first socket means which is attached to the catalyst regenerator vessel;
    (d) a second ball means attached to the upper end of each of said rigid supports seated in a second socket means which is attached to the regeneration gas distributor.

2. The apparatus of claim 1 wherein the primary support further includes means providing flow communication between the regeneration gas distributor and an air supply.

3. The apparatus of claim 1 which additionally comprises fiber insulating material between the first ball means and first socket means and between the second ball means and second socket means.

* * * * *